2,929,832

THIONOPHOSPHORIC ACID ESTERS AND PROCESS FOR THEIR MANUFACTURE

Gerhard Schrader, Wuppertal-Cronenberg, and Walter Lorenz, Wuppertal-Elberfeld, Germany, assignors to Farbenfabriken Bayer Aktiengesellschaft, Leverkusen, Germany, a corporation of Germany No Drawing. Application November 20, 1957
Serial No. 697,508

Claims priority, application Germany December 11, 1956

6 Claims. (Cl. 260—461)

The present invention relates to and has as its objects thiophosphoric acid ester derivatives of the following formula

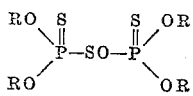

wherein R stands for lower hydrocarbon radicals preferably up to 6 carbon atoms.

In accordance with the present invention it has been found that this class of compounds is easily obtainable from dialkyl-dithiophosphoric acid disulfides, if the oxidation is carried out in such a manner that one sulfur atom is eliminated and the remaining bridging sulfur is oxidized to form the sulfoxide as can be seen from the following reaction scheme:

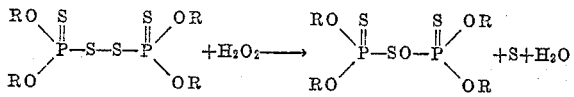

The oxidation of the disulfides is preferably effected with hydrogen peroxide in suitable solvents in a weakly acid medium at temperatures of 40–70° C. Glacial acetic acid has proved to be a particularly suitable solvent. It is however also possible to use hydrocarbons as solvents if this reaction is carried out, for example, in the presence of small amounts of sulfuric acid.

It has furthermore been found that esters of the aforesaid class are also obtainable in a simple manner by reacting dialkylamino sulfinic acid chlorides, with dialkyl thiolphosphites in inert solvents. Hydrocarbons such as benzene, toluene and ligroin have proved to be suitable solvents for this reaction. This new reaction proceeds for example as follows:

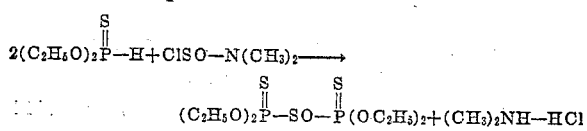

The dialkyl amino sulfinic acid chlorides which are obtainable by known methods are extremely sensitive to solvents containing hydroxyl groups. They are, however, indifferent towards dialkyl phosphites. It was therefore not to be expected that dialkyl amino sulfinic acid chlorides would react with the coresponding dialkyl thiolphosphites in the manner described above.

The new compounds of the present invention very effectively kill insects like flies, mites, aphids, etc. They distinguish themselves by good contact-insecticidal properties. Some have also a systemic action. All compounds thus obtained act moreover on eating insects such as caterpillars. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As an example for the special utility of the inventive compounds the following compound

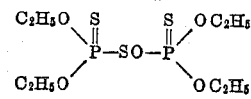

has been tested against flies and spider mites. Aqueous solutions have been prepared as follows: the active ingredient has been dissolved in the same amount of dimethyl formamide as auxiliary solvent, whereafter 20% by weight referred to active ingredient of benzyl hydroxy diphenyl polyglycol ether (commercial emulsifier) have been added. The mixture thus prepared is further diluted with water to the desired concentration indicated below.

Aqueous solutions of the aforementioned type containing 0.1% of active ingredient effectively kill spider mites (*Tetranychus altaeae*, V. Hanst i.e. two-spotted spider) on *Phaseolus vulgaris*, when spraying the plants to the run off. The killing rate has been determined after 24 hours. The effect on flies has been determined on *Musca domestica* in the screening test, thus under covered Petri dishes a drip wet filter paper containing 0.001% aqueous solutions has been placed and flies are brought under these Petri dishes. Complete killing has occurred after 24 hours.

The following examples are given for the purpose of illustrating the invention, but without limiting the present invention thereto.

Example 1

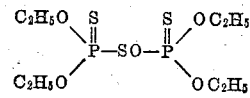

74 grams of tetraethyl-thionophosphoric acid disulphide are dissolved in 100 millilitres of glacial acetic acid with the addition of 1 millilitre of 50 percent sulphuric acid. 27 millilitres of 37.5% hydrogen peroxide are added dropwise with stirring at 40° C. The reaction proceeds with spontaneous heating. After the reaction heat has subsided, the temperature is maintained at 40° C. for another hour, the crude product is then taken up with benzene and the benzene layer is washed with a 3% sodium bicarbonate solution. After drying over sodium sulphate, the solvent is distilled off. The remaining crude sulphoxide distils at a pressure of 0.01 mm. Hg at 120–122° C.

Calculated: molecular weight 354: S=27.2%; P=17.6%. Found: S=26.6%; P=18.4%. $DL_{50}$ on rats orally: 10 mg./kg.

Fly maggots are still killed with aqueous emulsions containing 0.001 percent of the active substance. Mosquitoes are killed to 100 percent at a concentration of 0.01 percent within 160 minutes. At a concentration of 0.1 percent caterpillars are still killed with certainty. Flies are completely killed at a concentration of 0.001 percent. The new preparation kills spider mites to 100 percent at a concentration of 0.1 percent.

Example 2

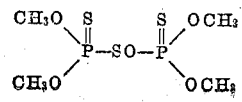

38 grams (0.3 mol) of dimethyl-thiol-phosphite (B.P. 53° C./16 mm. Hg) in 100 millilitres of benzene are slowly added dropwise to a solution of 19.2 grams (0.15 mol) of dimethylaminosulphinic acid chlorides in 200 millilitres of benzene. The temperature rises to 28-30° C. within an hour. After further heating to 50° C. for an hour, the precipitated dimethylamino hydrochloride is cooled and filtered off with suction, the benzene is washed with water with the addition of a little sodium bicarbonate solution and the product dried over anhydrous sodium sulphate. After distillation of the solvent, 24 grams of bis-[dimethylthiophosphoryl]-sulphoxide are obtained, after removal of a small amount of unreacted dimethyl-thio-phosphite, as a water-insoluble oil boiling at 55-60° C./0.01 mm. Hg.

*Example 3*

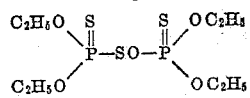

To a solution of 19.2 grams (0.15 mol) of dimethylaminosulphinic acid chloride (B.P. 58° C./2 mm. Hg) in 200 millilitres of benzene, a solution of 46.5 grams (0.3 mol) of diethylthiolphosphite (B.P. 68° C./122 mm. Hg) in 100 millilitres of benzene is added dropwise, starting at 20° C. The temperature slowly rises to 37-38° C. within 2 hours. Heating is continued at 50° C. for an hour, the precipitated dimethylamino hydrochloride is cooled and filtered off with suction and the benzene is washed with water. After drying over anhydrous sodium sulphate, the benzene is distilled off. 21 grams of bis-[dialkylthiophosphoryl]-sulphoxide, B.P. 94° C./0.01 mm. Hg, are obtained as a residue.

*Example 4*

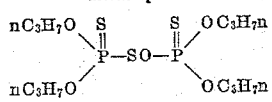

55 grams (0.3 mol) of di-n-propyl-thiol-phosphite (B.P. 62° C./3 mm. Hg) are added dropwise to a solution of 19.2 grams (0.15 mol) of dimethylaminosulphinic acid chloride in 200 millilitres of benzene. The temperature rises from 20 to 36° C. within an hour. The product is stirred at room temperature for about 12 hours and worked up in the manner described above. 60 grams of raw bis-[di-n-propyl-thiophosphoryl]-sulphoxide are obtained which, after collection of little first runnings, boils at 118° C./0.01 mm. Hg as a colourless to pale yellow oil.

*Example 5*

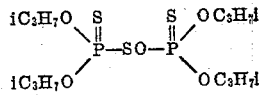

55 grams (0.3 mol) of diisopropyl-thiol-phosphite (B.P. 49° C./3 mm. Hg) are reacted with 19.2 grams (0.15 mol) of dimethyl-sulphinic acid chloride as described in Example 2 and the product is worked up in a corresponding manner. 55 grams of the crude product are thus obtained. After freezing out it is filtered off with suction from tetra-isopropyl-thiono-phosphoric acid disulphide (M.P. 92-93° C.) obtained as a by-product, and distilled. Bis-[diisopropyl-thiophosphoryl]-sulphoxide boils at 112-115° C./0.01 mm. Hg. Yield: 11 grams.

By the same way there may be obtained the four butyl esters of the following formula

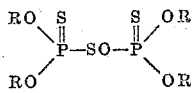

in which R stands for n-butyl, iso-butyl, sec. butyl and tert. butyl.

We claim:
1. Thiophosphoric acid esters of the formula

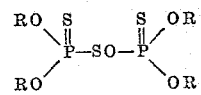

wherein R stands for a low molecular weight alkyl radical.

2. The thiophosphoric acid ester of the following formula

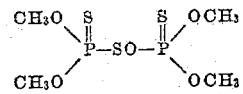

3. The thiophosphoric acid ester of the following formula

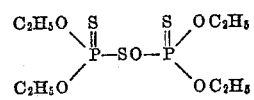

4. The thiophosphoric acid ester of the following formula

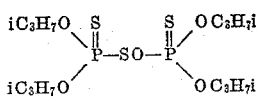

5. The process for the manufacture of thionophosphoric acid esters characterised by reacting dialkylaminosulfinic acid chlorides with 2 mols of a dialkyl-thiol-phosphite in organic solvents.

6. The thiophosphoric acid ester of the following formula

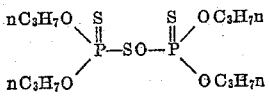

References Cited in the file of this patent
UNITED STATES PATENTS
2,508,364   Bell  ---------------- May 23, 1950

UNITED STATES PATENT OFFICE
CERTIFICATE OF CORRECTION

Patent No. 2,929,832  March 22, 1960

Gerhard Schrader et al.

It is hereby certified that error appears in the printed specification of the above numbered patent requiring correction and that the said Letters Patent should read as corrected below.

Column 2, lines 54 and 55, for "120-122° C." read -- 94° C. --; column 3, line 14, for "-thio-" read -- -thiol- --; line 24, for "122 mm." read -- 12 mm. --; same column 3, line 32, for "-[dialkylthiophosphoryl]-" read -- -[diethylthiophosphoryl]- --; column 4, line 1, for "dimethyl-sulfinic" read -- dimethyl-amino-sulfinic --.

Signed and sealed this 10th day of January 1961.

(SEAL)

Attest:

KARL H. AXLINE
Attesting Officer

ROBERT C. WATSON
Commissioner of Patents